2,612,377

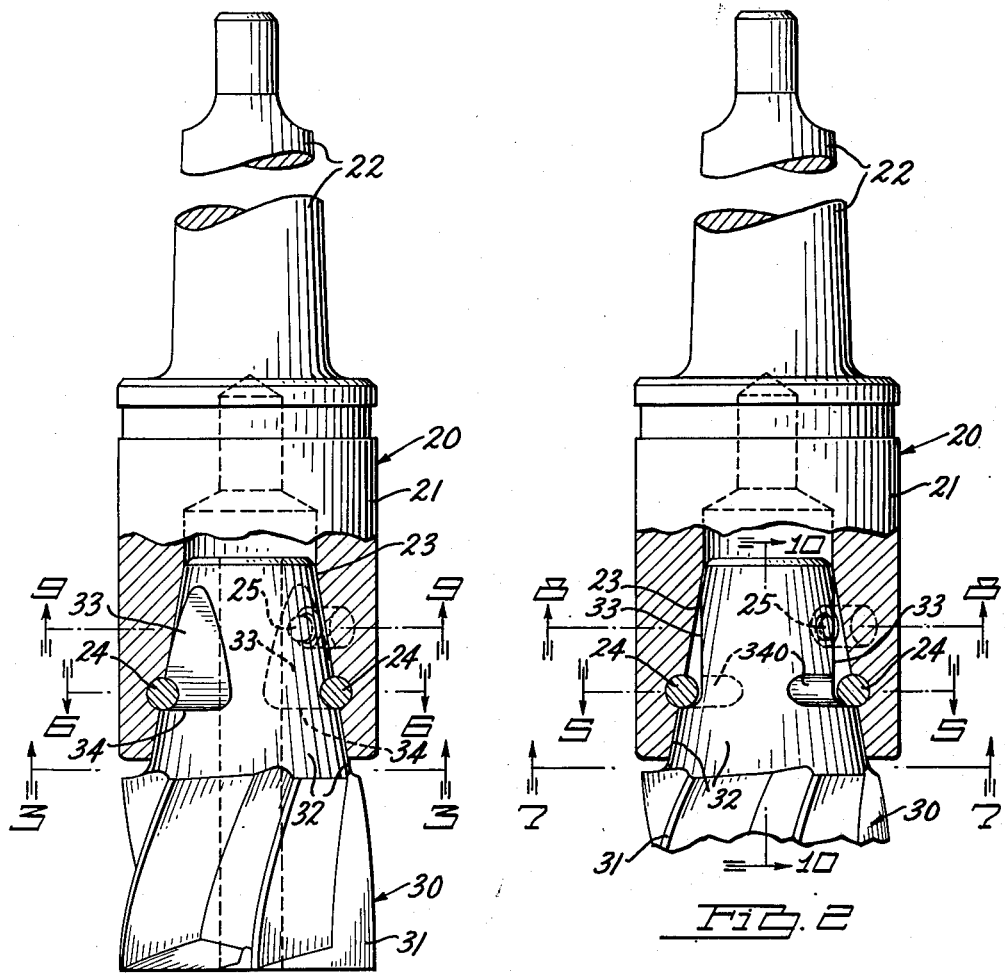
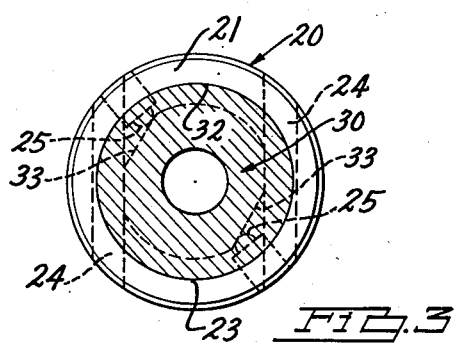
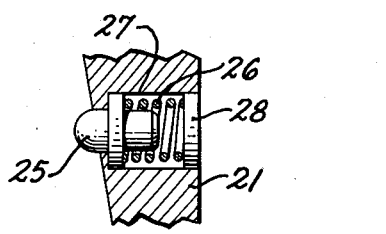
INVENTOR.
RALPH A. EDENS
BY Everett H. Wright
ATTORNEY Sept. 30, 1952  R. A. EDENS  2,612,377
TOOLHOLDER FOR TAPERED SHANKED TOOLS
Filed Aug. 1, 1950  2 SHEETS—SHEET 2
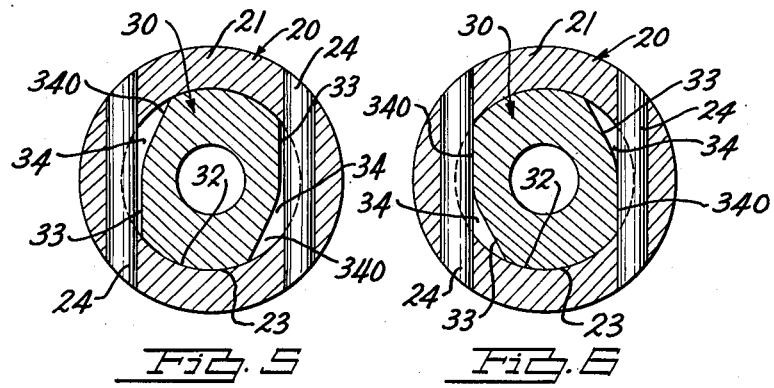
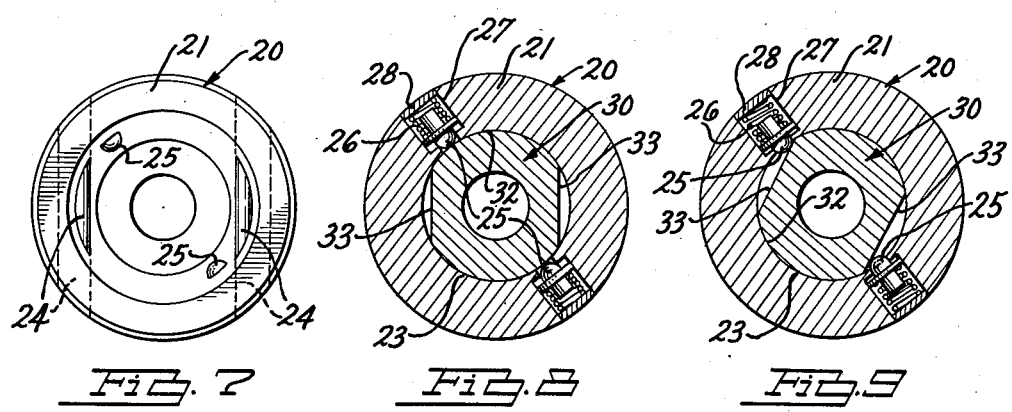
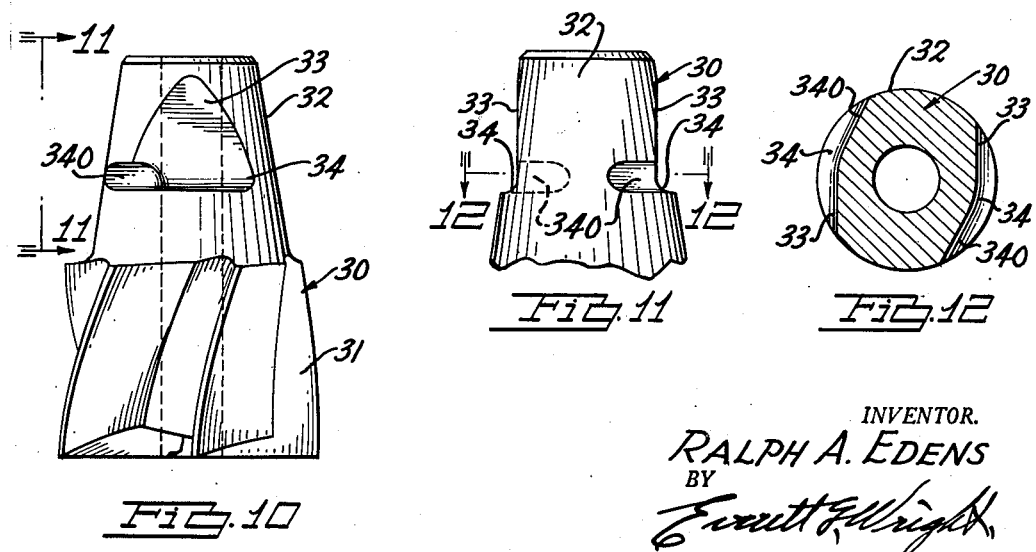
INVENTOR.
RALPH A. EDENS
BY
Everett G. Wright
ATTORNEY Patented Sept. 30, 1952

UNITED STATES PATENT OFFICE 2,612,377

TOOLHOLDER FOR TAPERED SHANKED TOOLS

Ralph A. Edens, East Detroit, Mich.

Application August 1, 1950, Serial No. 176,987

6 Claims. (Cl. 279—22)

This invention relates to improvements in tool holders for tapered shanked tools such as cutters, reamers, drills, end mills and the like.

This application is a continuation-in-part of my copending application, Serial No. 734,996, filed March 15, 1947, entitled Tool Holders which issued to patent on February 6, 1951, and which bears Number 2,540,937.

Tapered shanked tools and tool holders therefor are old in the art; nevertheless, much difficulty is encountered with "freezing" or binding of the tapered shank of a tool such as cutters, reamers, drills and the like into the tapered tool holder. Much time in machine and production shops is lost as a result of removing tapered tools from their holders and many tools have been dulled, chipped or broken during removal from their holders.

With the foregoing in view, the primary object of the invention is to provide an improved, accurate and effective tapered tool holder and tapered shanked tool therefor wherein the tapered shanked tool is quick locking and positively non-binding in the holder.

A further object of the invention is to provide, in combination, a tapered tool holder of the class described and tapered shanked tools therefor wherein a specific critical taper is employed which is found to provide perfect stability between the tool holder and tools held thereby while the tools are removably held in the tool holder by an extremely simple and improved quick locking and non-binding retainer construction.

Other objects of the invention will become apparent by reference to the following detailed description taken in connection with the accompanying drawings, in which:

Fig. 1 is a vertical elevational view of a tool holder and tapered shanked tool embodying the invention wherein the tapered shanked tool is shown in its locked working position in the tool holder, portions being broken away to show the construction.

Fig. 2 is a fragmentary view similar to Fig. 1 except that the tapered shanked tool is inserted in the tool holder, but not locked therein.

Fig. 3 is a transverse sectional view taken on the line 3—3 of Fig. 1 looking in the direction indicated by the arrows showing the tapered shanked tool locked within the tool holder.

Fig. 4 is an enlarged fragmentary sectional view showing one type of spring loaded detent that may be employed to lock the tapered shanked tool in the tool holder.

Fig. 5 is a transverse sectional view taken on the line 5—5 of Fig. 2 looking in the direction indicated by the arrows showing the relationship of locking cams of the tapered shanked tool to the locking pins of the tool holder when the tapered shanked tool is inserted but not locked in the tool holder.

Fig. 6 is a transverse sectional view taken on the line 6—6 of Fig. 1 looking in the direction indicated by the arrows showing the relationship of the locking cams of the tapered shanked tool to the locking pins of the tool holder when the tapered shanked tool is inserted in the tool holder and locked by turning clockwise with respect to the tool holder as viewed in Fig. 6.

Fig. 7 is a bottom view of the tool holder looking in the direction indicated by the arrows showing the spring loaded detents disposed in their normal position prior to inserting a tapered shanked tool therein.

Fig. 8 is a transverse sectional view taken on the line 8—8 of Fig. 2 looking in the direction indicated by the arrows showing the spring loaded detents retracted by the insertion of a tapered shanked tool therein.

Fig. 9 is a transverse sectional view taken on the line 9—9 of Fig. 1 looking in the direction indicated by the arrows showing the tapered shanked tool inserted therein and turned to a locking position, with the spring loaded detents of the tool holder in engagement with parallel flat surfaces formed on opposite sides of the tapered shank of the tool.

Fig. 10 is a side elevational view of the tapered shanked tool taken in a direction normal to one of the flat surfaces formed on opposite sides thereof.

Fig. 11 is a fragmentary side elevational view of the tapered shanked tool taken on the line 11—11 of Fig. 10.

Fig. 12 is a horizontal sectional view of the tapered shanked tool taken on the line 12—12 of Fig. 11.

Referring now to the drawings wherein like numerals refer to like and corresponding parts throughout the several views, the illustrative embodiment of the invention disclosed therein comprises the combination of a tool holder 20 including a body portion 21 and a tapered shank 22 adapted to fit into the rotating head of a machine tool, the said body portion 21 having a female taper 23 formed axially in the tool holding end thereof, locking pins 24 disposed in parallel relationship through the said body portion 21 near the tool holding end thereof which project into the said female taper 23 on opposite sides thereof, the said body portion 21 including a pair of oppositely disposed spring loaded detents 25 extending radially inward of the female taper 23 thereof and located axially above the said locking pins 24, the said spring loaded detents 25 being preferably of the ball headed pin or ball type backed up by a spring 26 disposed in a bored and counterbored aperture 27 plugged by a suitable plug 28 as best shown in Fig. 4, and a tapered shanked tool 30 including a cutting portion 31 and a male tapered shank 32 formed complementary to the female taper 23 in the tool holder 20, the said male tapered shank 32 having flat surfaces 33 formed on opposite sides thereof parallel to the longitudinal axis thereof, and cams 34 formed at the base of the said flat surfaces 33 of the said tapered shank 32 extending counterclockwise circumferentially therefrom partially around the said shank 32 as indicated by the numeral 340, the said cams 34 of the tapered shanked tool 30 engaging the locking pins 24 of the tool holder 20 and firmly holding the said tapered shanked tool 30 in the said tool holder 20 when the said tapered shanked tool 30 is positioned in the said tool holder 20 and turned clockwise as viewed in Fig. 3 whereupon the spring loaded detents 25 of the tool-holder 20 engage the flat surfaces 33 of the tapered shank 32 of the tapered shanked tool 30 and hold the said tapered shanked tool 30 against rotation in the tool holder 20.

In the foregoing locked position, the tapered shanked tool 30 is locked in positive non-binding working engagement in the tool holder 20 with the tapers 23 and 32 mated and cooperating. When the tapered shanked tool 30 is turned by hand counterclockwise as viewed in Fig. 3, the spring loaded detents 25 of the tool holder 20 are compressed until the flat surfaces 33 of the tapered shank 32 of the tapered shanked tool 30 become positioned parallel to the locking pins 24 of the tool holder 20 whereupon the tapered shanked tool 30 may be withdrawn easily and freely from the said tool holder 20. The spring loaded detent and cam action by means of which the positive non-binding locking of a tapered shanked tool 30 in the tool holder 20 is clearly shown in the drawings, particular reference being made to Figs. 2, 5 and 8 where the tapered shanked tool 30 is inserted in the tool holder 20 and to Figs. 1, 6 and 9 where the tapered shanked tool 30 has been turned into locking engagement within the said tool holder 20. The cam action is shown best in Figs. 1, 2, 5 and 6 and the locking spring action is shown best in Figs. 1, 2, 7, 8 and 9.

It has been discovered that by making the female taper 23 of the tool holder 20 and the male taper 32 of the tapered shanked tool 30 precisely 4.100 inches to 12.000 inches and mated, the desired firmness of the tool 30 in the tool holder 20 is accomplished without freezing of the tapered shank of the tool 30 in the tool holder 20. If the taper is less, the tool will freeze. If the taper is greater, the tool will wobble. It has been found that deviation of as little as .010 inch and mated from the 4.100 inch to 12.000 inch mated taper results in freezing or wobbling. Therefore, the desirable manufacturing tolerances on the taper should be plus or minus .010 inch and mated. The term "and mated" as here used means that the female taper in the tool holder 20 and the male taper on the tool shank 32 should mate precisely and that the manufacturing tolerances should not be plus in the female taper and minus on the male taper or vice versa.

Although but a single embodiment of the invention has been disclosed and described in detail, it is obvious that many changes may be made in the size, shape, arrangement and detail of the various elements of the invention without departing from the spirit and scope thereof as defined by the appended claims.

I claim:

1. In combination, a tool holder having an axially disposed female taper therein, and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said tool holder communicating with the female taper therein engageable by the cams formed in said tapered tool shank when the said tapered tool shank is inserted into the female taper in the said tool holder with the flattened sides thereof parallel to the said locking pins and then turned a partial turn with respect to the said tool holder, a pair of oppositely disposed spring loaded detents extending radially inwardly from the female taper in the said tool holder engaging the flattened opposite sides of the tapered shank of the tool whereby to maintain the said tapered shanked tool in its locked position therein.

2. In combination, a tool holder having an axially disposed female taper therein formed on a taper of 4.100 inches to 12.000 inches plus or minus .010 inches, and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said tool holder communicating with the female taper therein engageable by the cams formed in said tapered tool shank when the said tapered tool shank is inserted into the female taper in the said tool holder with the flattened sides thereof parallel to the said locking pins and then turned a partial turn with respect to the said tool holder, a pair of oppositely disposed spring loaded detents extending radially inwardly from the female taper in the said tool holder engaging the flattened opposite sides of the tapered shank of the tool whereby to maintain the said tapered shanked tool in its locked position therein.

3. In combination, a tool holder having an axially disposed female taper therein and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said tool holder communicating with the female taper therein engageable by the cams formed in said tapered tool shank when the said tapered tool shank is inserted into the female taper in the said tool holder with the flattened sides thereof parallel to the said locking pins and then turned a partial turn with respect to the said tool holder, a resilient cam means disposed in said tool holder extending axially inwardly from the said female taper therein located circumferentially to engage the said flattened sides of the tapered tool shank and removably hold the said tool in the said tool holder when turned with respect thereto.

4. In combination, a tool holder having an axially disposed female taper therein formed on a taper of 4.100 inches to 12.000 inches plus or minus .010 inches and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said toolholder communicating with the female taper therein engageable by the cams formed in said tapered tool shank when the said tapered tool shank is inserted into the female taper in the said tool holder with the flattened sides thereof parallel to the said locking pins and then turned a partial turn with respect to the said tool holder, a resilient cam means disposed in said tool holder extending axially inwardly from the said female taper therein located circumferentially to engage the said flattened sides of the tapered tool shank and removably hold the said tool in the said tool holder when turned with respect thereto.

5. In combination, a tool holder having an axially disposed female taper therein and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said tool holder communicating with the female taper therein engageable by the cams formed in said tapered tool shank to cause the said male and female tapers to mate when the said tapered tool shank is inserted into the female taper in the said tool holder with the flattened sides thereof parallel to the said locking pins and then turned a partial turn with respect to the said tool holder, a resilient ball type detent disposed in said tool holder positioned to retract when the tapered shank of the tool is inserted in the female taper of the tool holder and to engage the said flattened sides of the tapered tool shank and removably hold the said tool in the said tool holder when the said tool is turned with respect thereto.

6. In combination, a tool holder having an axially disposed female taper therein formed on a taper of 4.100 inches to 12.000 inches plus or minus .010 inches and a complementarily tapered shanked tool having the upper portion of the tapered shank thereof formed axially flat on opposite sides and having a pair of locking cams formed at the base of the said flattened opposite sides thereof extending part way around the said tapered shank therefrom, a pair of locking pins extending through the said tool holder communicating with the female taper therein engageable by the cams formed in said tapered tool shank to cause the said male and female tapers to mate when the said tapered tool shank is inserted into the female taper in the said tool holder with the flattened sides thereof parallel to the said locking pins and then turned a partial turn with respect to the said tool holder, a resilient ball type detent disposed in said tool holder positioned to retract when the tapered shank of the tool is inserted in the female taper of the tool holder and to engage the said flattened sides of the tapered tool shank and removably hold the said tool in the said tool holder when the said tool is turned with respect thereto.

RALPH A. EDENS.

REFERENCES CITED

The following references are of record in the file of this patent:

UNITED STATES PATENTS

| Number | Name | Date |
| --- | --- | --- |
| 389,404 | O'Neill | Sept. 11, 1888 |
| 1,413,280 | Kengel | Apr. 18, 1922 |
| 1,886,177 | Gairing | Nov. 1, 1932 |
| 1,975,877 | Thomas | Oct. 9, 1934 |
| 2,039,855 | Stone | May 5, 1936 |

FOREIGN PATENTS

| Number | Country | Date |
| --- | --- | --- |
| 214,669 | Switzerland | Aug. 1, 1941 |